(12) United States Patent
Ohba et al.

(10) Patent No.: US 12,157,463 B2
(45) Date of Patent: Dec. 3, 2024

(54) VEHICLE CONTROL DEVICE

(71) Applicant: Hitachi Astemo, Ltd., Hitachinaka (JP)

(72) Inventors: Mamoru Ohba, Hitachinaka (JP); Toshiyuki Innami, Hitachinaka (JP); Koichi Yokoura, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 238 days.

(21) Appl. No.: 17/795,111

(22) PCT Filed: Dec. 18, 2020

(86) PCT No.: PCT/JP2020/047352
§ 371 (c)(1),
(2) Date: Jul. 25, 2022

(87) PCT Pub. No.: WO2021/157220
PCT Pub. Date: Aug. 12, 2021

(65) Prior Publication Data
US 2023/0090474 A1  Mar. 23, 2023

(30) Foreign Application Priority Data

Feb. 6, 2020  (JP) ................. 2020-018982

(51) Int. Cl.
*B60W 30/09* (2012.01)
*B60W 10/18* (2012.01)
*B60W 30/095* (2012.01)

(52) U.S. Cl.
CPC ........... *B60W 30/09* (2013.01); *B60W 10/18* (2013.01); *B60W 30/0953* (2013.01); *B60W 2520/14* (2013.01); *B60W 2556/45* (2020.02)

(58) Field of Classification Search
CPC .. B60W 30/09; B60W 10/18; B60W 30/0953; B60W 2520/14; B60W 2556/45;
(Continued)

(56) References Cited

U.S. PATENT DOCUMENTS 9,751,506 B2\* 9/2017 Mudalige ............. G01S 17/931
2005/0206236 A1\* 9/2005 Mori ....................... B60T 17/18
303/175
(Continued)

FOREIGN PATENT DOCUMENTS

JP 2005-297945 A 10/2005
JP 2008-293438 A 12/2008
(Continued)

OTHER PUBLICATIONS

India Office Action issued on Feb. 7, 2023 for Indian Patent Application No. 202217043696.
(Continued)

*Primary Examiner* — Frederick M Brushaber
(74) *Attorney, Agent, or Firm* — Volpe Koenig (57) ABSTRACT

A vehicle control device causes an automatic brake to function even for an obstacle suddenly appearing from outside a sensor detection range in a place estimated to be dangerous such as an intersection. A vehicle control device calculates time-to-collision TTC based on a detection result of an obstacle sensor, and controls a brake, which is an actuator of a vehicle, based on the calculated time-to-collision TTC. The vehicle control device includes a determination unit that determines right turn or left turn of the vehicle, and a command unit that sends a command according to a determination result of the determination unit to the brake. When determining that the vehicle is turning right or left, the determination unit changes the time-to-collision TTC to a longer value by extending more than that at the time of traveling straight.

6 Claims, 11 Drawing Sheets

(58) Field of Classification Search
CPC ....... G08G 1/096725; G08G 1/096783; G08G 1/166; H04W 4/40; H04W 4/38; B60T 2210/32; B60T 8/17558; B60T 7/22
See application file for complete search history.

(56) References Cited

U.S. PATENT DOCUMENTS

| | | | | |
|---|---|---|---|---|
| 2016/0139598 A1* | 5/2016 | Ichikawa | ............... | B60W 30/09 |
| | | | | 701/25 |
| 2017/0232964 A1* | 8/2017 | Moritani | ................... | B60T 7/22 |
| | | | | 701/70 |
| 2019/0027036 A1* | 1/2019 | Mishina | ................ | B60W 30/09 |
| 2019/0193726 A1* | 6/2019 | Ishikawa | .................. | B60Q 1/44 |
| 2019/0291731 A1* | 9/2019 | Takaki | .................... | B60R 21/00 |

FOREIGN PATENT DOCUMENTS

| | | | |
|---|---|---|---|
| JP | 2010-211528 A | 9/2010 |
| JP | 2011-197706 A | 10/2011 |
| JP | 2014-201252 A | 10/2014 |
| JP | 2015-49583 A | 3/2015 |
| JP | 2017-140993 A | 8/2017 |
| JP | 2018-097689 A | 6/2018 |
| JP | 2019-121300 A | 7/2019 |
| KR | 20180100167 A | 9/2018 |

OTHER PUBLICATIONS

Japanese Office Action issued on Apr. 4, 2023 for Japanese Patent Application No. 2021-575646.

\* cited by examiner

| ID | DETECTION TIME | ATTRIBUTE | MOVEMENT DIRECTION | SPEED | DISTANCE (INCLUDING ESTIMATE) | POSITION | ESTIMATED PASSING TIME | ESTIMATED TTC |
|---|---|---|---|---|---|---|---|---|
| #1 | t | PEDESTRIAN | SAME | 3 | -1 | RIGHT | t+1 | — |
| #2 | t+1 | VEHICLE | — | 0 | 1 | LEFT | t+2 | 0 |
| #3 | t+2 | BICYCLE | SAME | 8 | 50 | RIGHT | t+9 | 8 |
| #4 | t+2 | PEDESTRIAN | SAME | 3 | 60 | LEFT | t+8 | 8 |
| #5 | t+2 | PEDESTRIAN | — | 0 | 70 | RIGHT | t+6 | 8 |

FIG. 10

| ID | DETECTION TIME | ATTRIBUTE | MOVEMENT DIRECTION | SPEED | DISTANCE (INCLUDING (ESTIMATE)) | POSITION | ESTIMATED PASSING TIME | ESTIMATED TTC |
|---|---|---|---|---|---|---|---|---|
| #3 | t+3 | BICYCLE | SAME | 8 | 2 | RIGHT | t+9 | 0.8 |
| #4 | t+5 | PEDESTRIAN | SAME | 3 | -1.5 | LEFT | t+8 | — |
| #5 | t+6 | PEDESTRIAN | — | 0 | 2 | RIGHT | t+6 | 1.5 |
| #6 | t+7 | PEDESTRIAN | LEFT | 3 | 5 | RIGHT | t+9 | 3 |
| #7 | t+7 | BICYCLE | ONCOMING | 4 | 10 | RIGHT | t+9 | 2 |
| #8 | t+6 | PEDESTRIAN | ONCOMING | 2 | 0 | LEFT | t+9 | |

ABSTRACT
VEHICLE CONTROL DEVICE

TECHNICAL FIELD

The present invention relates to a vehicle control device that actuates a safety device from external image information of an automobile.

BACKGROUND ART

Conventionally, there has been known a vehicle brake control device for the purpose of avoiding collision with a moving body such as a vehicle, a pedestrian, or a bicycle at an intersection and reducing damage. For example, PTL 1 discloses a method for performing pre-charge on a brake for a place estimated to be dangerous based on information input from an infrastructure facility or a navigation device, and generating prompt braking force with respect to the driver's depressing on a brake pedal.

CITATION LIST

Patent Literature

PTL 1: JP 2005-297945 A

SUMMARY OF INVENTION

Technical Problem

The method of PTL 1 shortens the reaction time from a driver's depressing operation on the brake pedal to actuation of an actuator at a place estimated to be dangerous. However, since the timing of depressing the brake pedal is left to the driver, there is a case where the method of PTL 1 does not function effectively depending on the driver's recognition and judgment.

In recent years, automatic brakes that automatically perform recognition, judgment, and operation in vehicles have become widespread.

In the case of automatic brakes, in a place estimated to be dangerous such as an intersection, there is a possibility that detection of a moving object is delayed due to limitation of a sensor detection range, and a brake actuation command is also delayed. However, if time-to-collision (TTC) from detection of a moving object to brake actuation is adapted so that the brake is actuated early, there is a problem of raising the false brake occurrence probability in normal traveling.

An object of the present invention is to provide a vehicle control device which causes an automatic brake to be functioned even for an obstacle appearing from outside a sensor detection range in a place estimated to be dangerous such as an intersection.

Solution to Problem

In order to solve the above problem, a determination unit that determines whether a vehicle turns right or left, and a command unit that sends a command to an actuator that drives the vehicle are included, and when the determination unit determines that the vehicle turns right or left, the command unit extends the time-to-collision until the vehicle collides with an object more than that at the time of traveling straight.

Advantageous Effects of Invention

According to the present invention, the brake can be actuated immediately after detection even during turning at an intersection or in a situation where an obstacle suddenly appears from outside the angle of view of an oncoming right-turning car and the like. In a situation other than the above situation, due to adoption of TTC having a normal margin, the occurrence of false brake can be suppressed.

Further features related to the present invention will become apparent from the description of the present description and the accompanying drawings. Problems, configurations, and effects other than those described above will be made clear by the description of embodiments below.

DESCRIPTION OF EMBODIMENTS

First Embodiment

Hereinafter, the first embodiment of the present invention will be described with reference to FIGS. 1 to 5.

Figure 1:
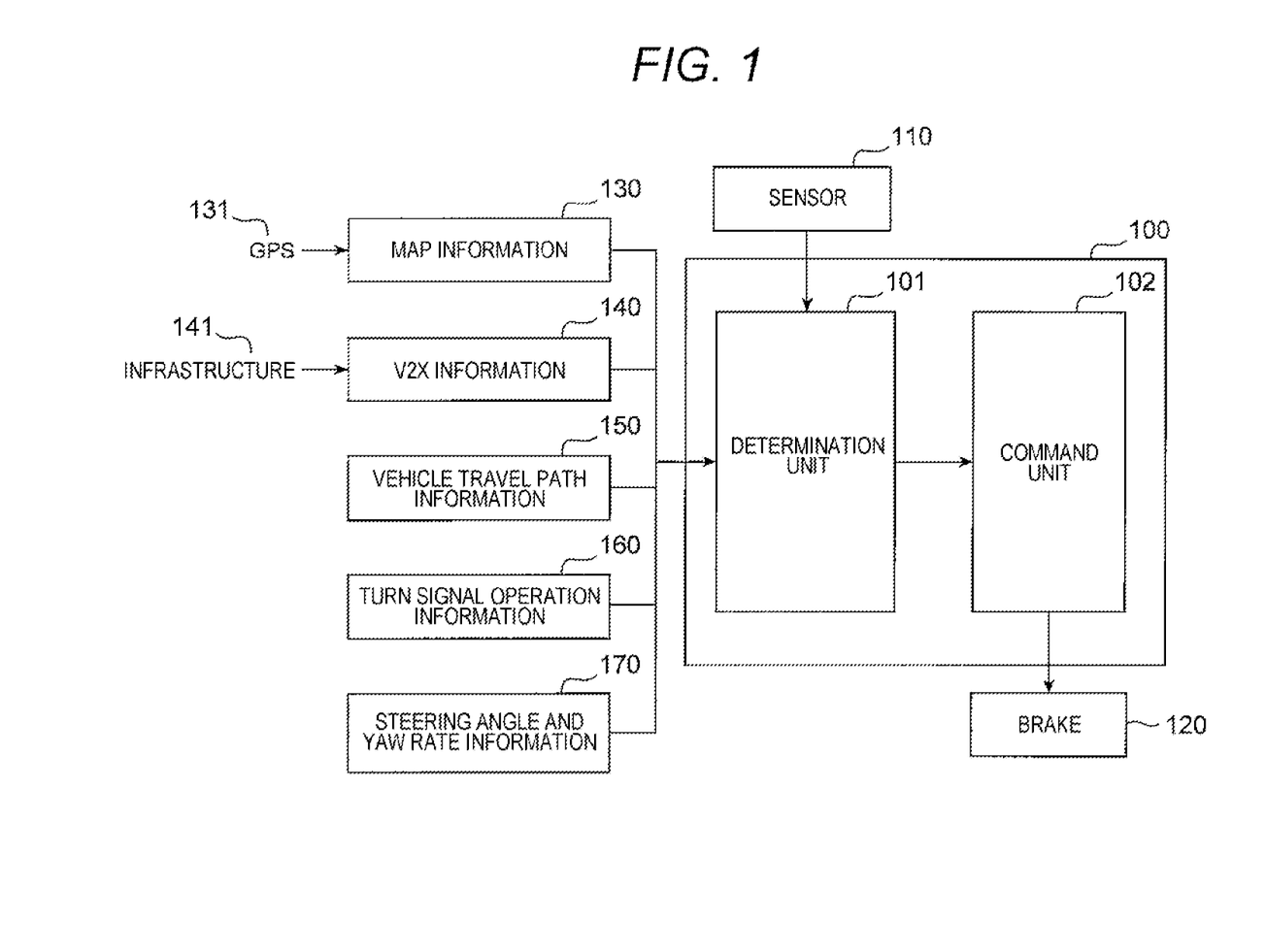
FIG. 1 is a block diagram illustrating a schematic configuration of a vehicle control device in a first embodiment of the present invention.

FIG. 1 is a block diagram illustrating a schematic configuration of the vehicle control device in the present embodiment.

A vehicle control device 100 controls a brake 120 based on external information and vehicle information, and is configured by cooperation of hardware such as an ECU mounted on the vehicle and a software program whose processing is executed by the hardware.

The vehicle control device 100 calculates obstacle TTC based on the detection result of an obstacle sensor 110, and controls the brake 120, which is an actuator of a vehicle 200 based on the calculated obstacle TTC. As illustrated in FIG. 1, the vehicle control device 100 includes a determination unit 101 and a command unit 102 as internal functions. The determination unit 101 includes a means for determining whether the vehicle turns right or left at a place estimated to be dangerous, and a means for recognizing that there is an obstacle in front of the vehicle and determining a possibility that the vehicle collides with the obstacle.

The determination unit 101 uses any or a combination of a plurality of pieces of the following information for determination of a place estimated to be dangerous and determination of turning right or left. That is, by using vehicle position information acquired by a map information acquisition unit 130 and a GPS 131, communication information with infrastructure facilities or surrounding objects acquired via a V2X information acquisition unit 140, preplanned vehicle travel path information acquired by a vehicle travel path information acquisition unit 150, operation situation information of a turn signal acquired by a turn signal operation information acquisition unit 160, steering wheel operation information acquired by a steering angle and yaw rate information acquisition unit 170, or the like, determination of a place estimated to be dangerous and determination of turning right or left are performed. For example, in a case where the vehicle is positioned in an intersection, the turn signal is operated, and the yaw rate is equal to or higher than a designated value, it is turning right or left at a place estimated to be dangerous, and it is determined that right/left turn is made at intersection.

For recognition of an obstacle and determination of collision possibility, information on the relative distance and the relative speed between the obstacle and the vehicle sensed by the obstacle sensor 110 and an estimation result of the degree of overlap between the obstacle and the travel path of the vehicle calculated from the information acquired by the vehicle travel path information acquisition unit 150 and the steering angle and yaw rate information acquisition unit 170 are used.

Determination of the possibility of collision with the obstacle is based on a preset time-to-collision (TTC). That is, it is determined that there is a possibility of collision when the time-to-collision with an obstacle (obstacle TTC) calculated from the relative distance and the relative speed between the vehicle and the obstacle falls below a preset AEB actuation margin time setting value. When determining that the vehicle turns right or left, the determination unit 101 sets again the preset AEB actuation margin time setting value to a value longer than that at the time of traveling straight. Then, the determination unit 101 sets again the gain of the brake pressure command value of the brake 120 so that a braking force stronger than that at the time of traveling straight acts on the command unit 102. Then, when the right turn or the left turn of the vehicle is completed, the setting value and the gain are returned to those at the time of traveling straight.

Then, when determining that the vehicle is turning right or left at the intersection, the determination unit 101 performs control to change the setting value of the AEB actuation margin time, which is the time-to-collision for operating the brake 120, to a longer value by extending more than that at the time of traveling straight. Details of this control will be described later.

The command unit 102 sends a command according to the determination result of the determination unit 101 to the actuator of the vehicle, and specifically, instructs the operation timing and the gain as a brake command value with respect to the brake 120. A command is output to the brake 120 to actuate at a timing when it is determined that there is a collision possibility as a result of collision determination from the determination unit 101 as the operation timing.

The determination unit 101 changes the gain of the brake pressure command value to rise when it is determined that right/left turn is made by the determination on right/left turn of the determination unit 101 and the setting value of the AEB actuation margin time is changed. This makes it possible to apply a strong braking force when it is determined that the vehicle collides with the obstacle during turning right or turning left. At the time of braking, the command unit 102 may instruct control to turn on the stop light of the vehicle or control to cause the engine to use the engine brake in combination. The command unit 102 may instruct control to cause the steering to adjust the steering angle.

As the configuration to give input information to the determination unit 101, the vehicle control device 100 is connected with the map information acquisition unit 130, the V2X information acquisition unit 140, the vehicle travel path information acquisition unit 150, the turn signal operation information acquisition unit 160, the steering angle and yaw rate information acquisition unit 170, and the obstacle sensor 110, and is connected with the brake 120 that operates by a brake command output by the command unit 102.

The map information acquisition unit 130, the V2X information acquisition unit 140, the vehicle travel path information acquisition unit 150, the turn signal operation information acquisition unit 160, and the steering angle and yaw rate information acquisition unit 170 are connected to the input side of the vehicle control device 100, and external information around the vehicle and vehicle information of the vehicle are input to the vehicle control device 100. External information is also input from the obstacle sensor 110. The brake 120 is connected to an output side of the vehicle control device 100.

The map information acquisition unit 130 acquires map information indicating the vehicle position from a map or the like stored on a medium or a cloud and a GPS signal received by the vehicle. The map information is mainly used to determine whether or not the vehicle is positioned inside an intersection.

By road-to-vehicle communication or vehicle-to-vehicle communication, the V2X information acquisition unit 140 acquires information indicating an intersection from road equipment such as infrastructure information 141 and information indicating an intersection from surrounding vehicles. From this V2X information, it can be recognized that the vehicle is positioned inside the intersection. The vehicle travel path information acquisition unit 150 acquires information on a vehicle travel path on which the vehicle is scheduled to travel from a predetermined travel plan, route guidance, and the like. The vehicle travel path information is used to determine whether or not the vehicle is positioned inside an intersection or whether or not the vehicle turns right or left.

The turn signal operation information acquisition unit 160 acquires information on whether or not a turn signal (blinker) of the vehicle has been operated. The fact that the turn signal has been operated indicates that the driver intends to turn right or left, and it can be determined that right/left turn is made.

The steering angle and yaw rate information acquisition unit 170 acquires information on the steering angle and the yaw rate based on detection signals from a steering angle sensor that detects the steering angle of the vehicle and a vehicle speed sensor that detects the vehicle speed of the vehicle. The information on the steering angle and the yaw rate is used to determine the driver intention of turning right or left and whether the driver has actually operated the steering wheel for turning right or left.

The obstacle sensor 110 has a function of sensing an obstacle in front of the vehicle, and includes a stereo camera, a monocular camera, Lidar, a millimeter wave radar, a combination thereof, or the like. The obstacle sensor 110 has a detectable angle θ of view, and has limitation in detection range in the horizontal direction. Therefore, there is sometimes a situation in which someone is jumping out and to cross the road from a short distance or, during turning of the vehicle, an obstacle suddenly appears from outside the detection range.

The brake 120 is a brake actuating by a brake command output by the command unit 102. The brake 120 is a so-called autonomous emergency braking (AEB), which automatically performs brake control for collision avoidance or damage reduction when it is determined that the possibility of collision is high. The brake 120 is an actuator that controls the vehicle.

Figure 2A:
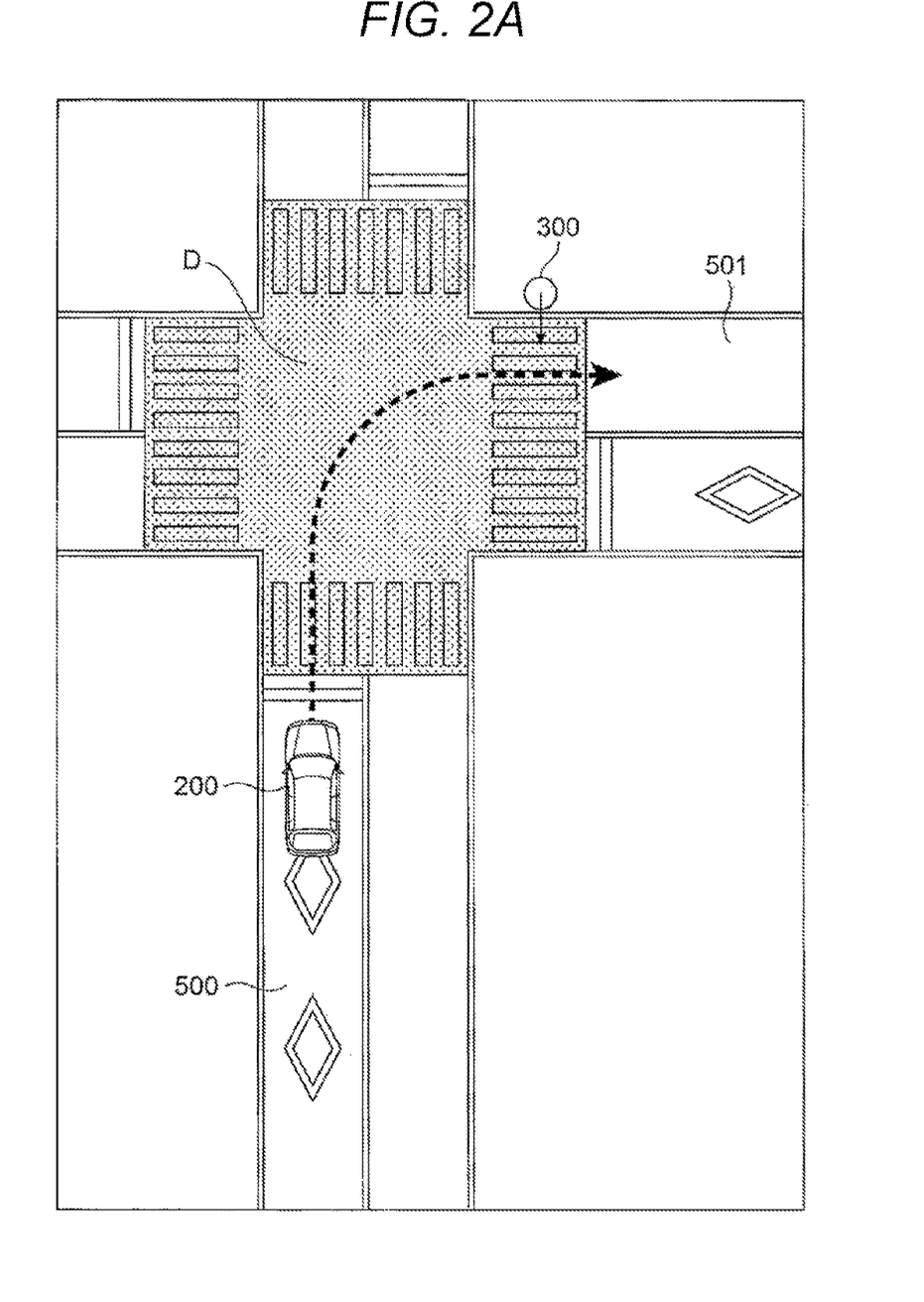
FIG. 2A is a view illustrating an example of a region estimated to be dangerous around an intersection.
Figure 2B:
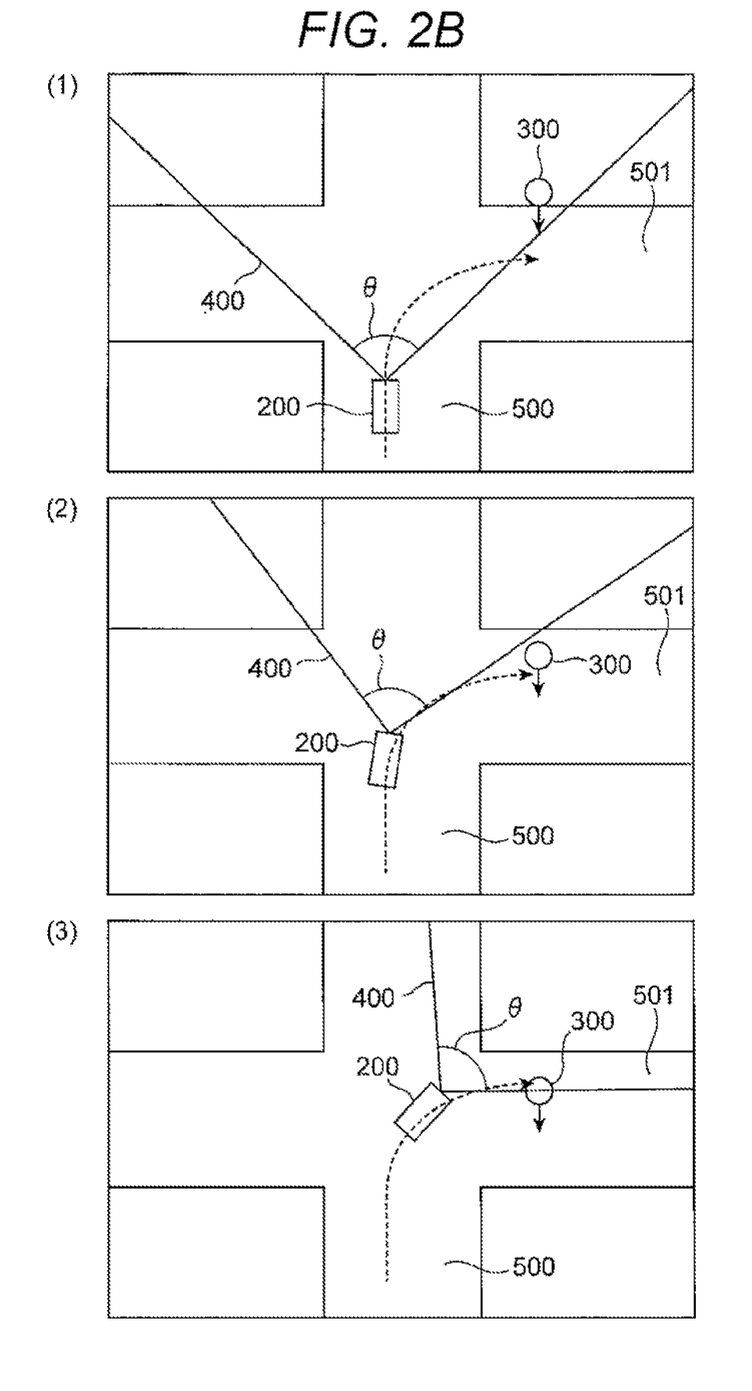
FIG. 2B is a view explaining a situation when a vehicle turns right or left, which is a problem of the present invention.

FIGS. 2A and 2B are views explaining the problem to be solved by the present invention. FIG. 2A is a view illustrating an example of a region estimated to be dangerous around an intersection, and FIG. 2B is a view schematically illustrating a situation when the vehicle turns right at the intersection. FIGS. 2A and 2B illustrate, as an example, a case where the vehicle 200 turns right at an intersection of a crossroad where a road 500 and a road 501 intersect and a pedestrian 300 crosses the road 501 ahead of the right turn.

As illustrated in FIG. 2A, a region D estimated to be dangerous exists at and around the intersection. In FIG. 2B, time passes in the order of (1) to (3). (1) of FIG. 2B illustrates a situation where the vehicle 200 is positioned just before the intersection, and is about to enter the intersection and turn right. At this time, since the pedestrian 300 is within the range of the angle θ of view of the obstacle sensor 110 of the vehicle 200 and is positioned within a detection range 400 that can be detected by the obstacle sensor 110, the pedestrian 300 is detected as an obstacle of an automatic brake target.

Subsequently, (2) of FIG. 2B illustrates a situation in which the vehicle 200 has entered the intersection. At this time, the pedestrian 300 is crossing the road and has moved near the center of the road 501. As a result, since the pedestrian 300 is out of the range of the angle θ of view of the obstacle sensor 110 and is positioned outside the detection range 400 of the obstacle sensor 110, the obstacle sensor 110 cannot sense the pedestrian 300. Therefore, at this time point, the pedestrian 300 does not become an obstacle of the automatic brake target.

Subsequently, (3) of FIG. 2B illustrates a situation where the vehicle 200 has turned deeply in the direction of the pedestrian 300. At this time, the pedestrian 300 enters the detection range 400 of the obstacle sensor 110 again. However, at this time, the vehicle 200 is approaching the pedestrian 300, the distance between the vehicle 200 and the pedestrian 300 is short, and unless immediately applying the brake, the vehicle 200 is likely to collide with the pedestrian 300.

Thus, in a case of accompanying turning of the vehicle 200 for entering an intersection, a site, or the like, an obstacle of the automatic brake target may suddenly appear in the detection range 400 of the obstacle sensor 110 and at a relatively short distance. In order to cope with such a case, it is conceivable of shortening more the time from sensing an obstacle to actuating the brake on a routine basis, or raising the brake command gain so as to obtain a strong braking force.

However, if the time from sensing the obstacle to actuating the brake is shortened, and the brake is actuated early, there is a possibility of raising the false brake occurrence probability at the time of traveling straight. Therefore, in general, in order to suppress the occurrence of false braking caused by false sensing or the like of an obstacle sensor or the like, a time from sensing the obstacle to actuating the brake is often given a margin. The brake command gain is also often set to be low in accordance with the margin time.

Figure 3:
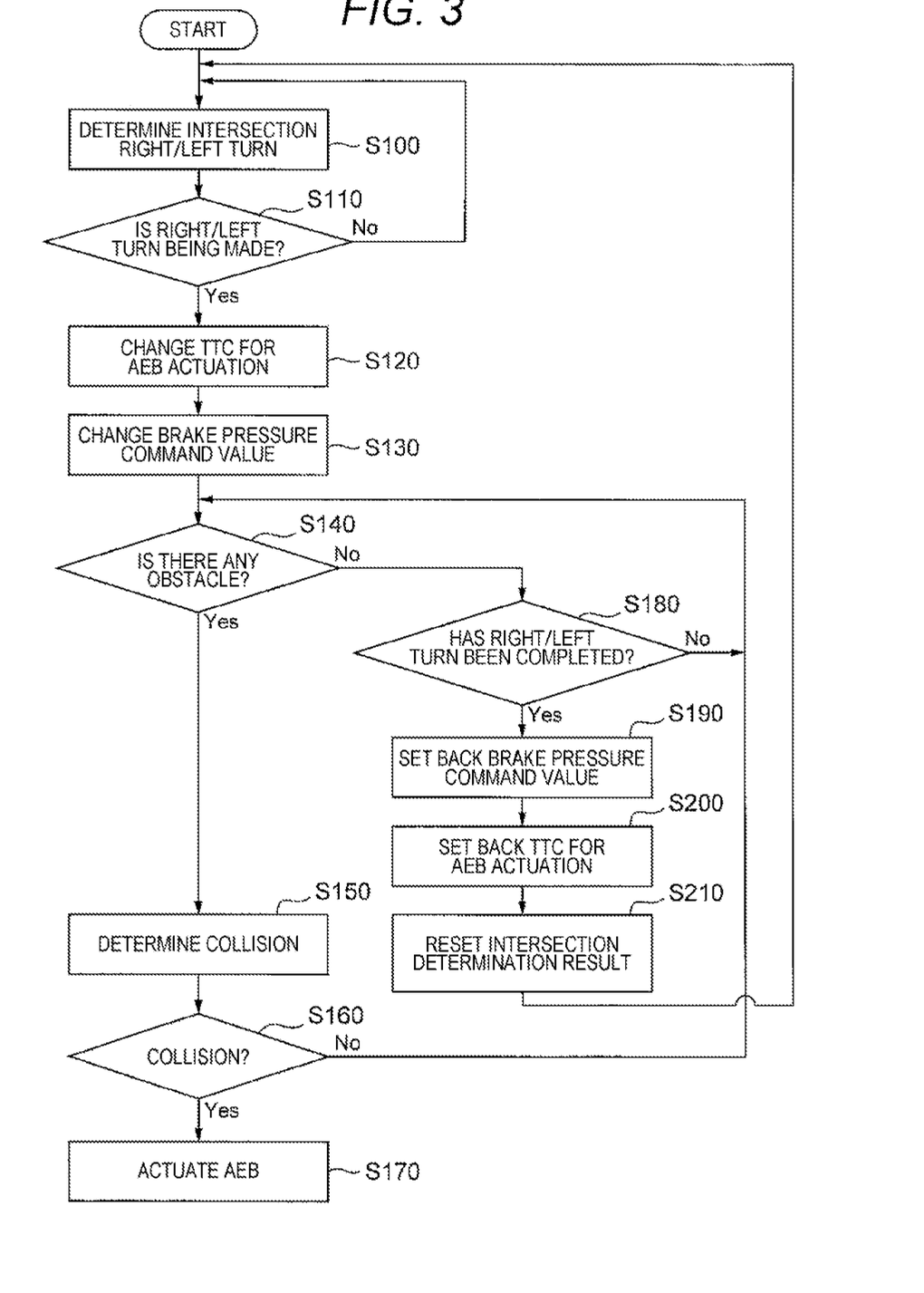
FIG. 3 is a flowchart explaining control processing in the first embodiment of the present invention.

FIG. 3 is a flowchart presenting the operation of the present invention.

S100 is intersection right/left turn determination processing. In the intersection right/left turn determination processing, it is determined whether or not the vehicle enters the intersection during traveling and is turning right or left, and a state of whether or not the vehicle is turning right or left is declared as a result of the determination. Details of the intersection right/left turn determination processing in S100 will be described with reference to FIG. 4.

S110 is a branch based on the result of the intersection right/left turn determination processing of S100. If it is determined in the intersection right/left turn determination processing of S100 that the vehicle is not turning right or left, the process returns to the intersection right/left turn determination processing of S100. If it is determined in the intersection right/left turn determination processing of S100 that the vehicle is turning right or turning left, the process moves to changing processing of the setting value of the AEB actuation margin time (TTC for AEB actuation) of S120.

In the changing processing of the AEB actuation margin time setting value in S120, the setting value of the AEB actuation margin time, which is margin time until brake control is automatically started for collision avoidance or damage reduction, is changed to be longer than that at the normal time (at the time of traveling straight). For example, the setting value of the AEB actuation margin time set to 0.8 seconds at the normal time is changed to 1.0 second. Thus, the brake 120 in which the obstacle TTC calculated from the relative distance to the obstacle and the relative speed is actuated from 0.8 seconds is actuated within 1.0 second, and the brake 120 is actuated about 0.2 seconds earlier. The brake 120 is immediately actuated for an obstacle whose obstacle TTC is within 1.0 second at the time of obstacle detection.

In the brake pressure command value changing processing of S130, the gain of the brake pressure command valve when the brake 120 is actuated as an automatic brake is raised and changed to a value higher than that at the normal time (at the time of traveling straight). This makes it possible to apply a braking force stronger than the automatic brake at the normal time when an obstacle suddenly appears in an intersection.

S140 is a branch based on presence/absence determination of an obstacle. The presence/absence determination of an obstacle is a result of the determination made based on the relative distance, the relative speed, and the relative lateral position with respect to the target object, which are information from the obstacle sensor 110. If there is an obstacle in the detection range 400 of the obstacle sensor 110 (Yes in S140), the process moves to the collision determination processing in S150. If there is no obstacle in the detection range 400 of the obstacle sensor 110 (No in S140), the process moves to the right/left turn completion determination processing in S180.

S150 is the collision determination processing. The obstacle TTC is calculated based on the relative distance, the relative speed, and the relative lateral position with respect to the target object, which are information from the obstacle sensor 110. This calculation result is sent to the collision determination processing in S1.60.

S160 is the collision determination processing. In the collision determination processing of S160, if the calculation result of S150 is within the setting value of the changed AEB actuation margin time changed in S120, it is determined as collision (Yes in S160), and the process moves to the ABB actuation processing of S170.

If it is determined as no collision (No in S160), the process returns to the obstacle presence/absence determination process in S140. However, since there are few cases where the obstacle suddenly disappears, it is also possible to return to the collision determination of S150 assuming that an obstacle is present. S170 is the AEB actuation processing. In the AEB actuation processing of S170, the brake 120 is actuated as an automatic brake.

Up to here is a basic process flow in a case where the obstacle suddenly appears in the angle of view that is the detection range 400 of the obstacle sensor 110 while the vehicle 200 is turning right or left at the intersection.

If there is no obstacle during turning right or left, the process moves to the right/left turn completion determination branch processing in S180 in the branch based on the presence/absence determination of the obstacle in S140. The determination as to whether or not the right or left turn has been completed in S180 is made based on information on a map and GPS, information on V2X, or information on travel path estimation used in the intersection right/left turn determination processing in S100, but it can also be determined from the steering angle of the vehicle.

If it is determined in the right/left turn completion determination branch processing of S180 that the right/left turn is not completed, that is, if it is determined that the right/left turn is in progress, the process returns to the obstacle presence/absence determination branch of S140. On the other hand, if it is determined in the right/left turn completion determination branch processing of S180 that the right/left turn has been completed, the process moves to processing of returning the brake pressure command value of S190 to the value at the normal time, processing of returning the setting value of the AEB actuation margin time in S200 to the value at the normal time, and processing of resetting the intersection determination result in S210.

Next, details of the intersection right/left turn determination processing in S100 will be described with reference to FIG. 4.

Figure 4:
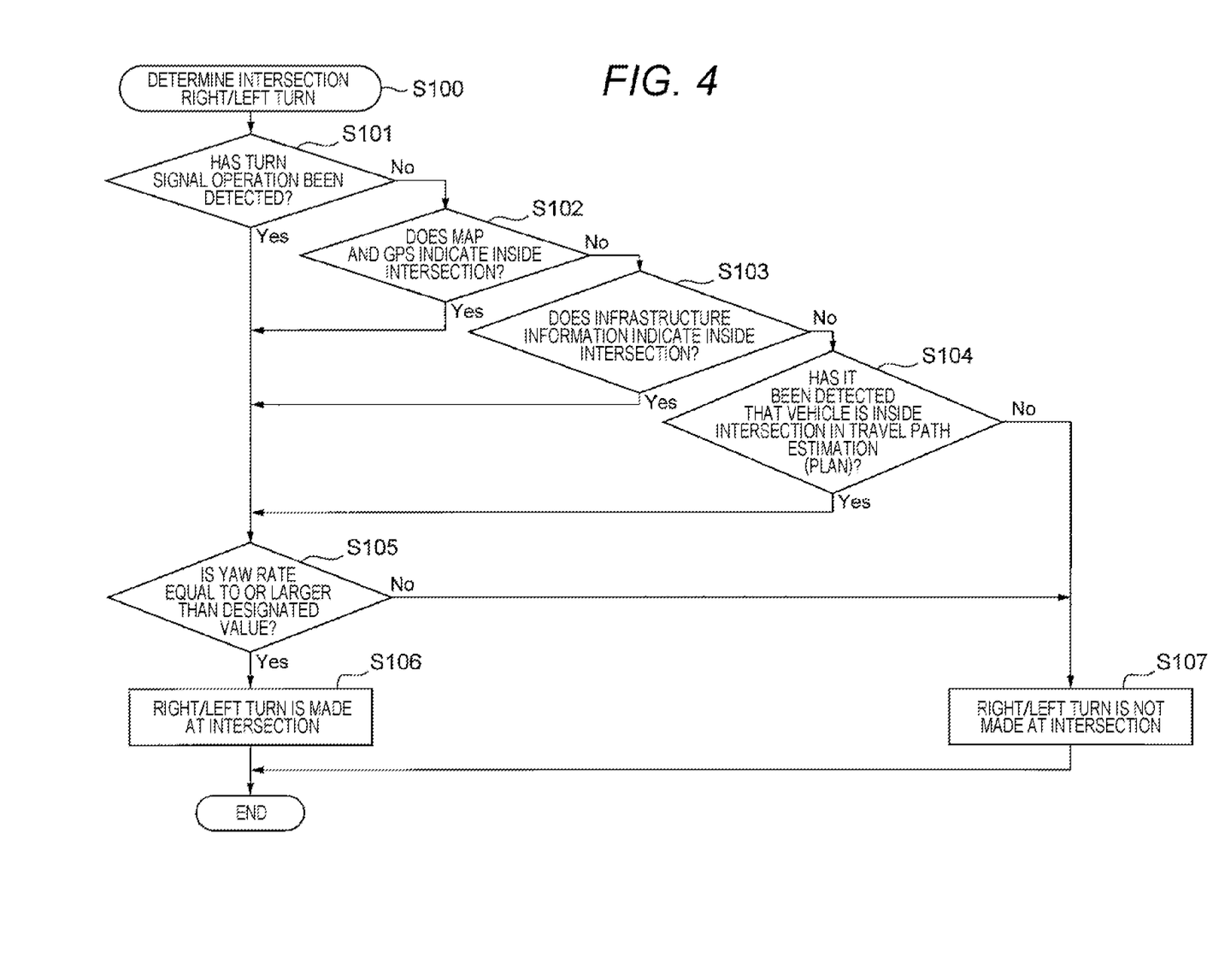
FIG. 4 is a flowchart explaining intersection right/left turn determination processing.

FIG. 4 is a flowchart explaining the intersection right/left turn determination processing. In a case where it is detected that the vehicle is positioned inside an intersection by any of che blinker operation detection branch in S101, the inside-intersection determination branch based on the map and the GPS in S102, the inside-intersection determination branch based on infrastructure information in S103, and the inside-intersection determination branch based on the travel path estimation in S104, the process moves to determination as to whether or not the yaw rate in S105 is equal to or greater than a designated value. IF it is determined by the determination of S101, S102, S103, and S104 that the vehicle is not positioned inside the intersection, it is determined in S107 that right/left turn is not made at intersection.

The determination as to whether or not the yaw rate is equal to or greater than the designated value in S105 is to determine that the turning has actually been performed when it is determined that the vehicle is inside the intersection. If the yaw rate is equal to or greater than the designated value, it is determined that the vehicle is turning, and it is determined that right/left turn is made at intersection in S106. When the yaw rate is smaller than the predetermined value, it is determined that the vehicle is not turning, and it is determined right/left turn is not made at intersection in S106. Note that even during actual turning, when the turning speed is low, che risk is also low, so that it is not determined that right/left turn is made at intersection.

Figure 5:
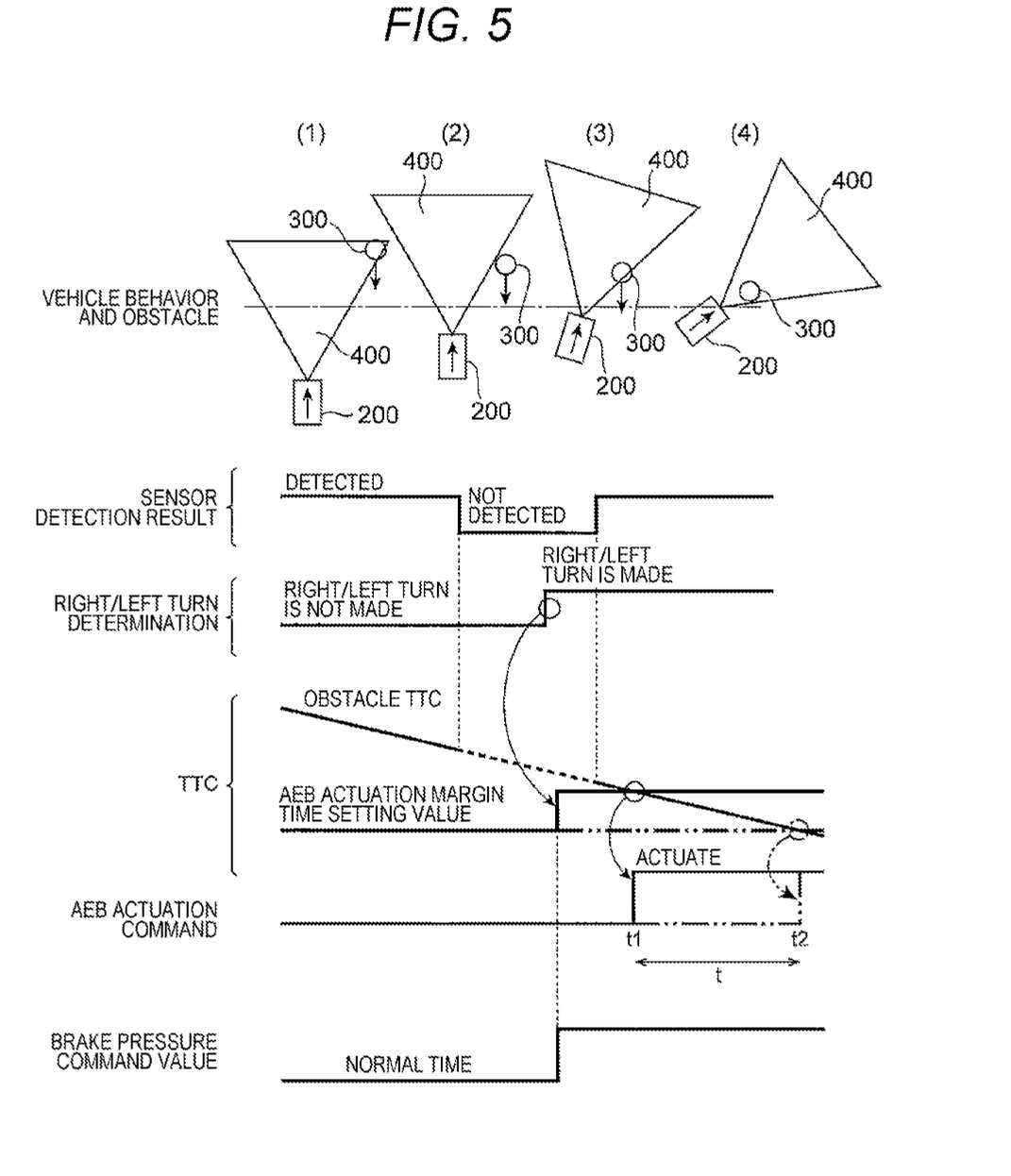
FIG. 5 is a timing chart explaining a behavior in the first embodiment of the present invention.

Next, a timing chart of each processing in the first embodiment is illustrated in FIG. 5. FIG. 5 is a timing chart of each processing corresponding to an image of a time course of vehicle behavior and the obstacle. In FIG. 5, time elapses from left to right, and the positional relationship between the vehicle behavior and the obstacle changes as illustrated in (1) to (4) of FIG. 5.

First, at the stage where the vehicle 200 reaches the intersection, as illustrated in (1), there is a sufficient distance between the vehicle 200 and the obstacle 300, and the obstacle 300 is within the angle of view of the obstacle sensor 110 and is positioned within the detection range 400 of the obstacle sensor 110, and therefore the sensor detection result is "detected". Then, since the vehicle 200 is positioned inside the intersection but before turning, the result of the in-intersection right/left turn determination becomes "right/left turn is not made".

The obstacle TTC between the vehicle 200 and the obstacle 300 gradually decreases due to the approach of both. When the vehicle 200 further approaches the obstacle 300, as illustrated in (2), the obstacle 300 is out of the detection range 400 of the obstacle sensor 110, and the sensor detection result becomes "not detected". Due to this, the value of the obstacle TTC also disappears.

Subsequently, when the vehicle 200 starts turning inside the intersection, the determination result of the in-intersection right/left turn becomes "right/left turn is made". Due to this, the setting value of the AEB actuation margin time is set again to a value longer than that at the normal time (at the time of traveling straight), and the brake pressure command value is also set again to a value higher than that at the normal time.

Subsequently, when the vehicle 200 turns and starts to face the direction of the obstacle 300, the obstacle 300 appears within the angle of view (within the detection range 400) as illustrated in (3). As a result, the detection result becomes "detected", and the obstacle TTC is also recalculated.

Furthermore, at the time point when the obstacle TTC matches the setting value of the AEB actuation margin time, the AEB operation command is changed from OFF to ON, and the brake 120 is actuated at time t1. If the processing of changing the setting value of the AEB actuation margin time is not performed at the time of right/left turn in the present embodiment, the timing of starting che actuation of the brake 120 is delayed to time t2 at which the normal AEB actuation margin time setting value and the obstacle TTC match as indicated by a two-dot chain line in FIG. 5.

According to the present embodiment, it is possible to actuate AEB at the timing of time t1, which is earlier by time t than the conventional case where AEB is actuated at time t2, and it is possible to apply a stronger braking force than that of the automatic brakes at the normal time.

According to the present embodiment, for example, when turning right or left at an intersection or the like, the setting value of the AEB actuation margin time is changed to be longer than that in the normal time, and the gain of the brake pressure command value is also set to be higher than that in the normal time. Therefore, even when the obstacle 300 such as a pedestrian or a bicycle suddenly appears in the detection range 400 from outside of the detection range 400 of the obstacle sensor 110, it is possible to immediately actuate the brake 120, apply a stronger braking force, and increase the possibility of collision avoidance.

In the above embodiment, as indicated by the broken line in FIG. 5, the example in which calculation of the obstacle TTC is stopped in a section where the sensor detection result is "not detected" has been described. However, for example, calculation of the obstacle TTC may be continued also in a section where the sensor detection result is "not detected", and may be reflected in the way of applying the brake.

Second Embodiment

Next, the second embodiment of the present invention will be described below with reference to FIGS. 6 to 10. Note that components similar to those in the first embodiment are given identical reference signs, and detailed description thereof will be omitted.

A characteristic feature of the present embodiment is a setting method of a setting value of the AEB actuation margin time, more specifically, selecting an obstacle having the highest collision risk, that is, an obstacle having the shortest obstacle TTC, from among a plurality of obstacles detected within the detection range including an obstacle having gone outside the detection range from within the detection range, and setting the setting value of the ABB actuation margin time in which collision can be avoided based on the obstacle TTC of the selected obstacle. This makes it possible to set the setting value of the AEB actuation margin time to a value that is not too long, not too short, and has higher accuracy. Therefore, for example, even when an obstacle of automatic brake target suddenly appears within the detection range 400 of the vehicle during right/left turning of the vehicle and becomes an obstacle having the highest collision risk, the brake 120 can be actuated at an appropriate timing, and the possibility of collision avoidance can be increased.

The determination unit 101 sets the setting value of the AEB actuation margin time by performing the following processing (1) to (4). (1) Recording detection results of all the obstacles detected by the obstacle sensor 110 of the vehicle 200 as targets. (2) Calculate the obstacle TTC of each target using the detection result recorded by the above (1). The obstacle TTC is estimated also for a target outside the detection range 400 of the obstacle sensor 110. (3) Upon receiving a determination result that the vehicle turns right or left, selecting a target having the highest collision risk, that is, the shortest obstacle TTC, from targets present in the traveling direction of the vehicle. (4) Setting the setting value of the AEB actuation margin time based on the obstacle TTC of the target selected by the above (3). The setting value of the ABB actuation margin time is changed to a longer value by extending more than that at the time of traveling straight.

Figure 6:
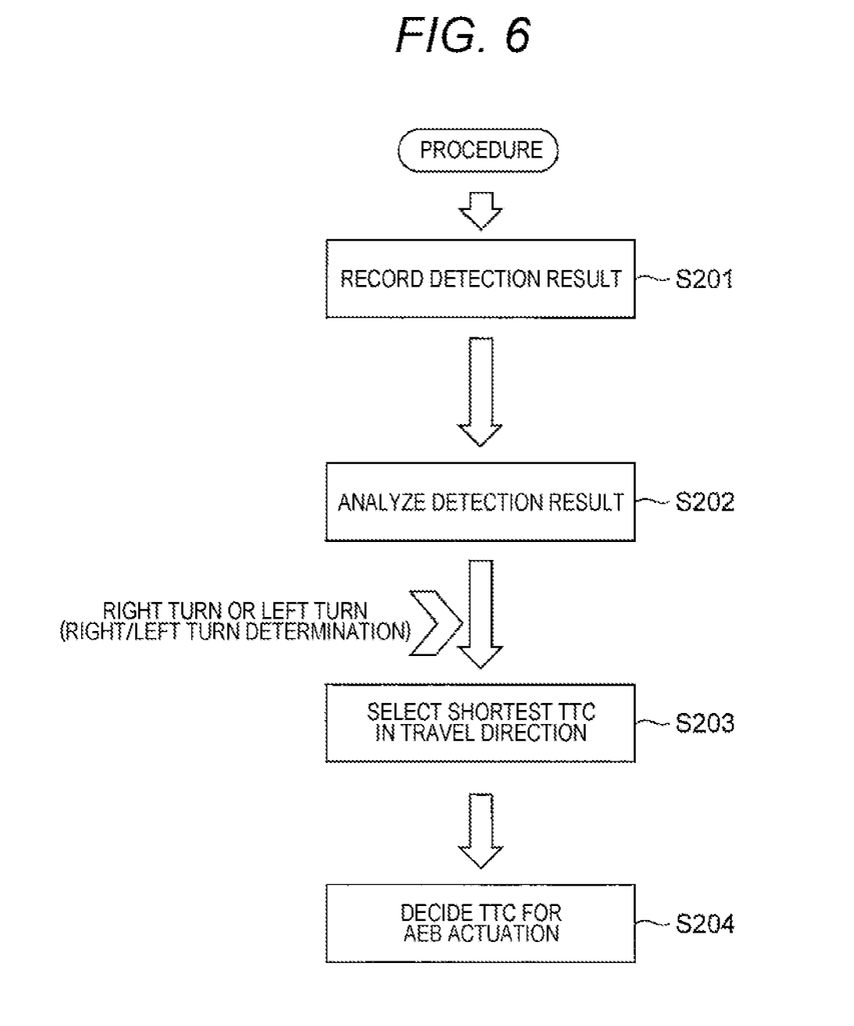
FIG. 6 is a flowchart explaining a setting method of an AEB actuation margin time setting value in a second embodiment of the present invention.

FIG. 6 is a flowchart explaining in detail the setting method of the AEB actuation margin time setting value in the present embodiment.

First, in S201, detection results of all targets detected by the obstacle sensor 110 of the vehicle 200 are recorded. Information recorded as the detection result includes information on relative speed and relative distance of the detection object with respect to the vehicle, lateral position, attribute (car, motorcycle, bicycle, pedestrian, and the like), and time for updating the detection result, and these pieces of information are recorded at a constant cycle.

In S202, the detection result of each target is analyzed. Here, the obstacle TTC for all targets is calculated. The calculation of the obstacle TTC is performed for each detection result, and a scheduled time (estimated passing time) at which the target passes is calculated. Then, it is determined whether or not the target has passed based on the scheduled time, and for the target that has already passed, information on the target and its detection result are deleted from the record.

Then, in S203, in a case where it is determined that right/left turn is made by the right/left turn determination, the shortest obstacle TTC in the traveling direction of the vehicle is selected as the obstacle TTC of the obstacle estimated to have the highest possibility of collision. Here, the target estimated to have the shortest obstacle TTC is selected from all targets based on the analysis result of the detection result and the traveling direction (turning right or left) of the vehicle.

Then, in S204, a setting value of the ABB actuation margin time is determined. Here, processing of setting, as a setting value of the ABB actuation margin time, time in which the margin is added to the obstacle TTC of the target selected in S203 is performed. Due to this, the setting value of the AEB actuation margin time is changed to a longer value by extending more than that at the time of traveling straight.

Figure 7:
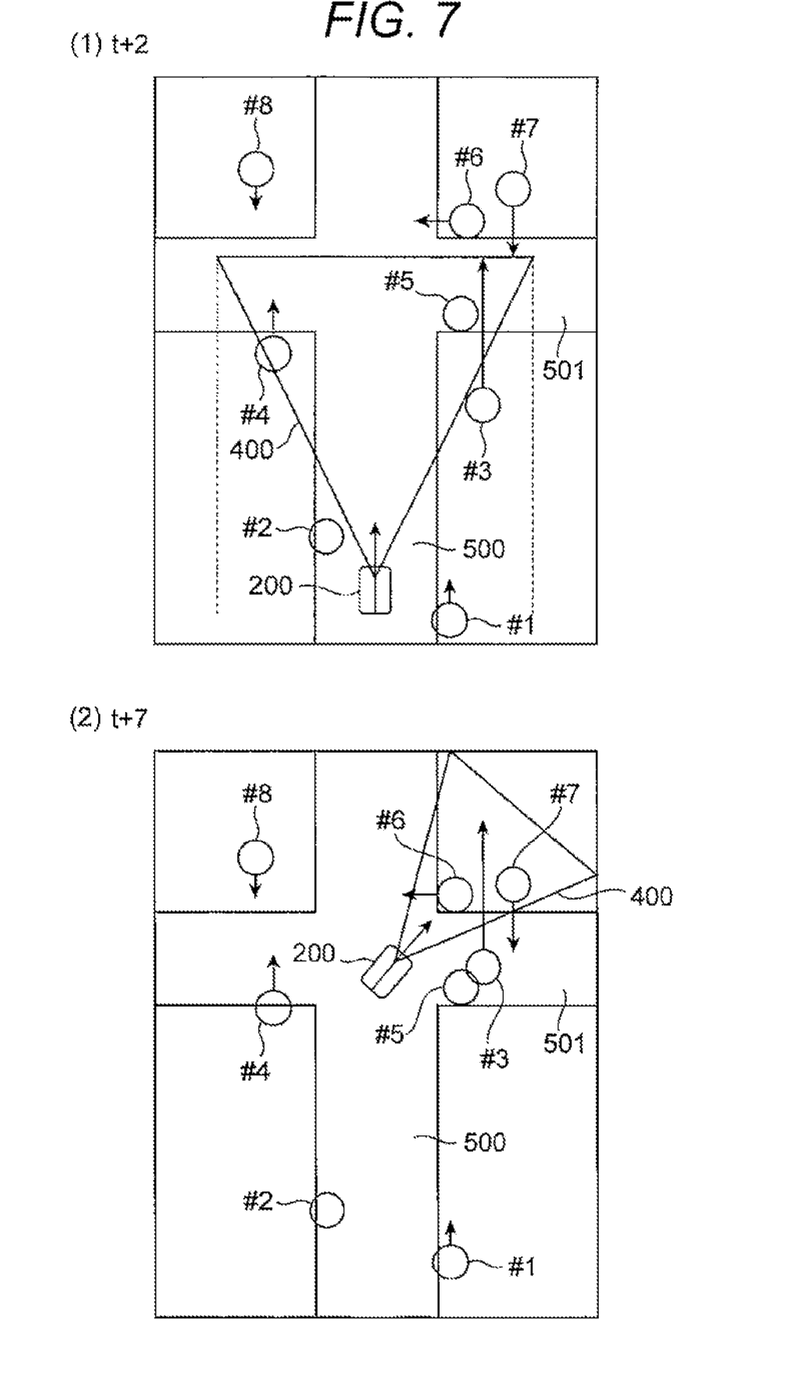
FIG. 7 is a view illustrating positions of a vehicle and a target at times t+2 and t+7.
Figure 8:
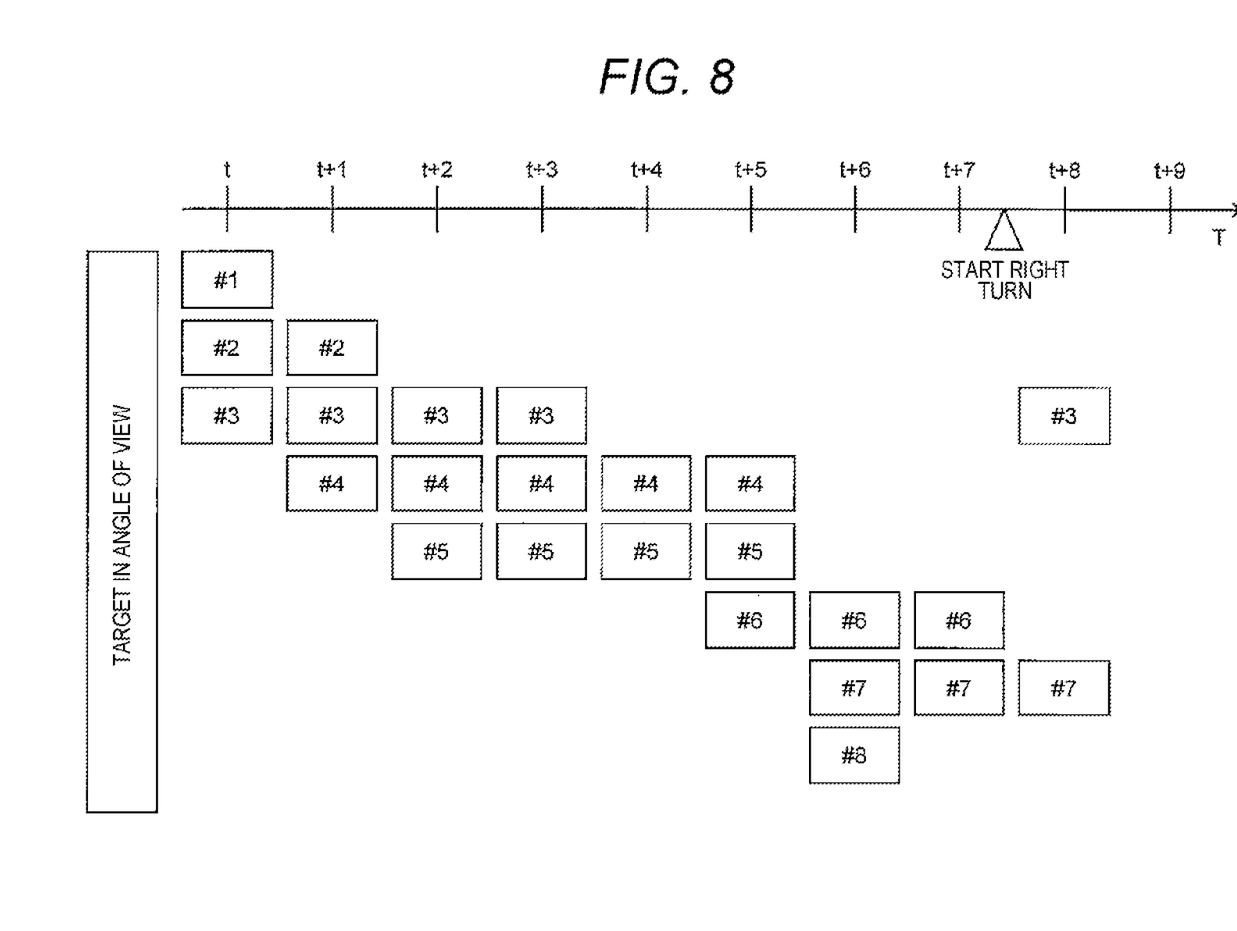
FIG. 8 is a view illustrating targets present within a detection range for each time.

Next, a specific example of a case where the vehicle turns right at an intersection will be described below with reference to FIGS. 7 to 10. FIG. 7 is a view illustrating a change in position between the vehicle and a target when the vehicle turns right at an intersection from certain time t, FIG. 7 (1) is a view illustrating a situation at time t+2, and FIG. 7 (2) is a view illustrating a situation at t+7. FIG. 8 is a view illustrating targets present within the detection range for each time in the situation illustrated in FIG. 7.

At time t, a total of eight targets #1 to #8 are present as obstacles at and around the intersection. The arrows attached to the targets in FIGS. 7 (1) and 7 (2) indicate the moving direction of the targets, and the length of the arrow means the moving speed.

In the situation at time t+2, which is advanced by two cycles from time t, as illustrated in FIG. 7 (1), the vehicle 200 is positioned just before the intersection, and the targets #3 to #5 are positioned within the detection range 400 of the vehicle 200. On the other hand, in the situation at time t+7, which is advanced by seven cycles from time t, as illustrated in FIG. 7 (2), the vehicle 200 has just started turning right in the intersection, and the targets #6 and #7 are positioned within the detection range 400 of the vehicle.

Also, a target out of the detection range 400 with the travel of the vehicle is positioned within the detection range 400 at a certain time, and therefore in the present embodiment, when the target is positioned within the detection range 400, the relative distance, the relative speed, and the attribute (information of vehicle, bicycle, human, and the like) of the target are grasped and recorded.

Figure 9:
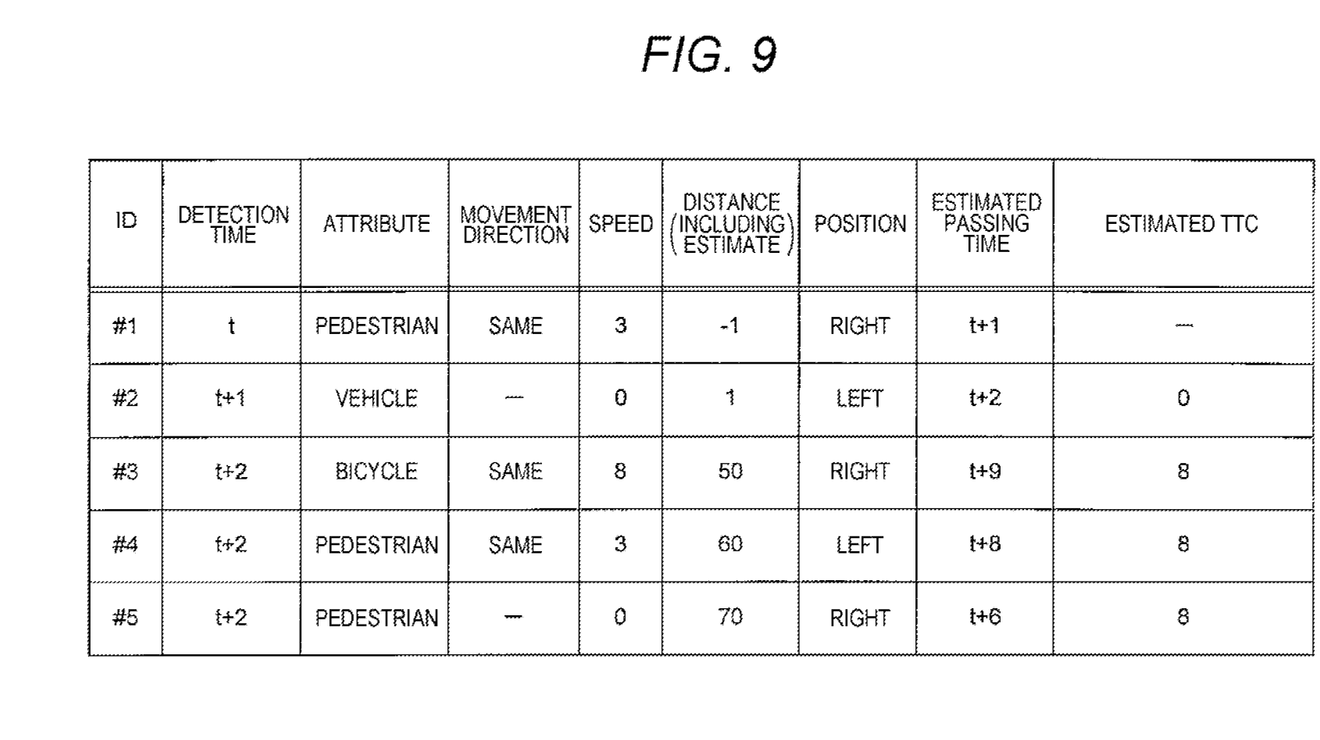
FIG. 9 is a table presenting detection result of targets at time t+2.
Figure 10:
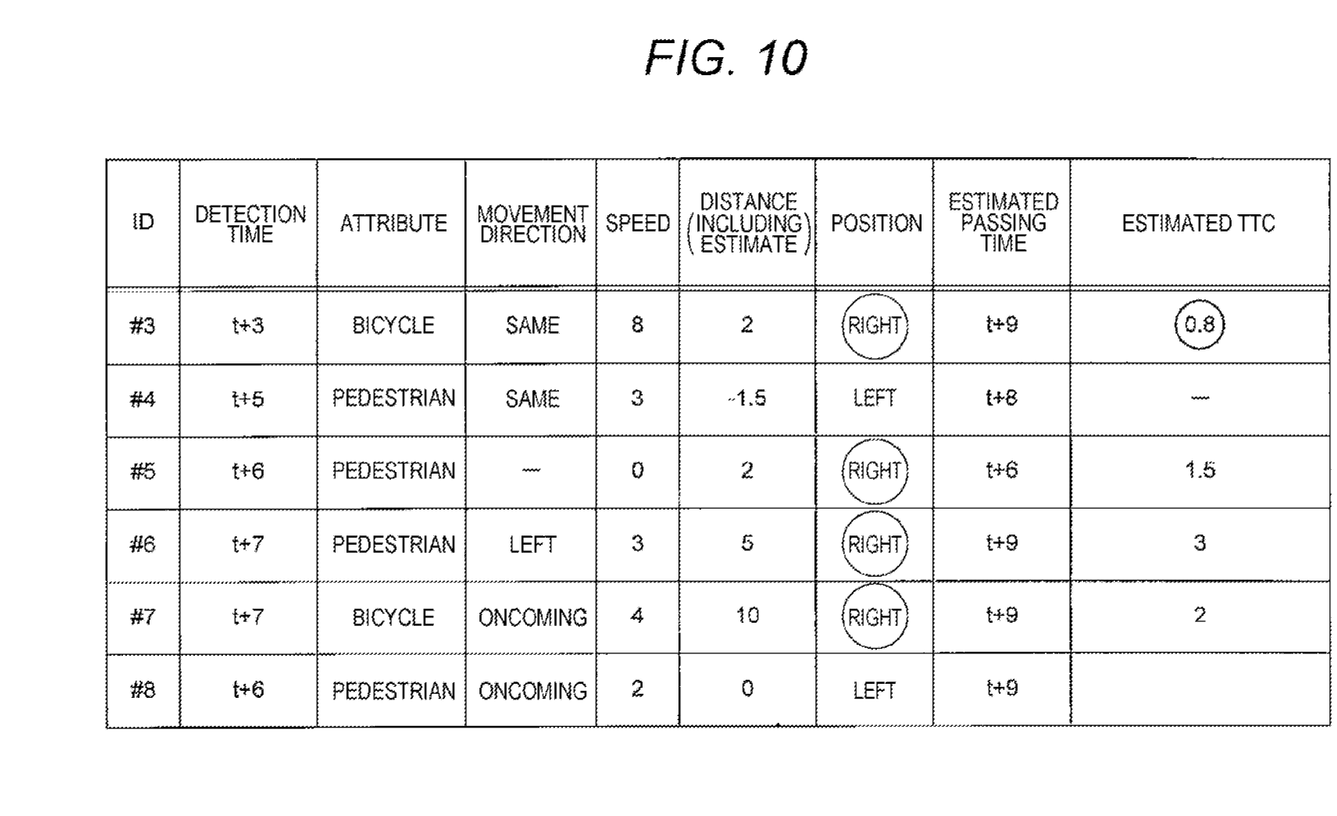
FIG. 10 is a table presenting detection result of targets at time t+7.

FIG. 9 is a table presenting the record and analysis result up to time t+2, and FIG. 10 is a table presenting the record and analysis result up to time t+7.

In the present embodiment, as illustrated in FIGS. 9 and 10, the relative speed with respect to the target, the lateral position, and the like necessary for calculation of the obstacle TTC are recorded. As illustrated in FIG. 8, the targets #1 and #2 are positioned within the detection range 400 at time t and time t+1, but have moved out of the detection range 400 at time t+3.

For the obstacles moved out of the detection range 400 such as the targets #1 and #2, the obstacle TTC at the current time is estimated by calculation based on the relative distance and the relative speed at the time immediately before moving out of the detection range 400, and recorded as the estimated TTC. For each target, an estimated passing time in the case of passing while maintaining the vehicle speed is calculated, those having passed the estimated passing time by a large amount are excluded from the recording target, and the processing load of the calculation processing of the vehicle control device 100 is reduced.

While the information on the target positioned within the detection range 400 is updated to the latest information, the relative distance is calculated from the information immediately before moving out of the detection range 400 and the vehicle speed, and the obstacle TTC is continuously estimated (estimated TTC) for the target moved out of the detection range 400.

After time t+7, right turn is started. When the setting value of the ABB actuation margin time is changed by the right/left turn determination, matching between the turning direction (right turn or left turn) of the vehicle and the position (right or left with respect to the vehicle) of the target is confirmed, and the shortest TTC is selected from the obstacle TTC and the estimated TTC.

Then, time that is given a margin is set for the selected shortest TTC. For example, in the example illustrated in FIG. 10, since the shortest TTC is 0.8 seconds of the estimated TTC of the target #3, 0.2 seconds is added as time to give a margin, and the AEB actuation margin time is changed to 1.0 second.

This makes it possible to set the setting value of the changed AEB actuation margin time to an appropriate value, and possible to actuate the brake 120 with higher accuracy. Therefore, for example, also when the bicycle of the target #3 moves out of the detection range 400 at the timing of time t+4 and appears again within the detection range 400 at the timing of time t+8, the brake 120 can be actuated with the setting value of the AEB actuation margin time appropriately set for the bicycle of the target #3.

Although the embodiments of the present invention have been described in detail above, the present invention is not limited to the above embodiments, and various design changes can be made without departing from the spirit of the present invention described in the claims. For example, the above-described embodiments have been described in detail in order to describe the present invention in an easy-to-understand manner, and are not necessarily limited to those including all the described configurations. It is possible to replace a part of the configuration of one embodiment with the configuration of another embodiment, and it is also possible to add the configuration of another embodiment to the configuration of one embodiment. It is further possible to add, delete, or replace other configurations for part of the configuration of each embodiment.

REFERENCE SIGNS LIST

- 100 vehicle control device
- 101 determination unit
- 102 command unit
- 110 obstacle sensor
- 120 brake
- 130 map information acquisition unit
- 131 GPS
- 140 V2X information acquisition unit
- 150 vehicle travel path information acquisition unit
- 160 turn signal operation information acquisition unit
- 170 steering angle and yaw rate information acquisition unit
- 200 vehicle
- 300 pedestrian
- 400 detection range.

The invention claimed is:

1. A vehicle control device that calculates time-to-collision based on a detection result of an obstacle sensor and controls an actuator of a vehicle based on the calculated time-to-collision, the vehicle control device comprising:
    an electronic control unit configured to:
    determine right turn or left turn of a vehicle;
    send a command in accordance with a determination result of the electronic control unit to the actuator, and
    wherein:
    when determining that the vehicle is turning right or left, the electronic control unit changes the time-to-collision to a longer value by extending more than time-to-collision at time of traveling straight,
    the actuator is a brake,
    when changing the time-to-collision, the electronic control unit changes a gain of a brake pressure command value of the brake, and
    the electronic control unit changes the gain of the brake pressure command value to rise in a case where the electronic control unit determines that the vehicle is making a right turn or left turn.

2. The vehicle control device according to claim 1, wherein the electronic control unit determines right turn or left turn of the vehicle based on any of or a plurality of combinations of a turn signal of the vehicle, a traveling direction of the vehicle, a position of the vehicle, and communication between the vehicle and a surrounding object.

3. The vehicle control device according to claim 1, wherein when determining completion of right turn or left turn of the vehicle, the electronic control unit cancels extension of the time-to-collision and returns to a value at time of a straight line.

4. The vehicle control device according to claim 1, wherein the electronic control unit determines right turn or left turn of the vehicle based on a steering angle and a yaw rate of the vehicle.

5. The vehicle control device according to claim 1, wherein when the obstacle sensor detects a plurality of obstacles, the electronic control unit calculates time-to-collision for each of the plurality of obstacles, selects shortest time-to-collision from among a plurality of times-to-collision, and changes the selected time-to-collision to a longer value by extending more than time-to-collision at time of traveling straight.

6. The vehicle control device according to claim 5, wherein the electronic control unit estimates time-to-collision with an obstacle having moved out of a detection range of the obstacle sensor, selects shortest time-to-collision from among the estimated time-to-collision and the plurality of times-to-collision, and changes the selected time-to-collision to a longer value by extending more than time-to-collision at time of traveling straight.

* * * * *